(12) United States Patent
Chen

(10) Patent No.: US 8,478,025 B2
(45) Date of Patent: Jul. 2, 2013

(54) COMPUTING GENUS AND HOMOLOGY GROUPS IN 3D DIGITAL SPACE

(75) Inventor: Li Chen, Ashburn, VA (US)

(73) Assignee: Li Chen, Ashburn, VA (US)

( * ) Notice: Subject to any disclaimer, the term of this patent is extended or adjusted under 35 U.S.C. 154(b) by 287 days.

(21) Appl. No.: 13/374,652

(22) Filed: Dec. 2, 2010

(65) Prior Publication Data

US 2012/0300995 A1 Nov. 29, 2012

(51) Int. Cl.
*G06K 9/00* (2006.01)

(52) U.S. Cl.
USPC .......................................... 382/154; 382/128

(58) Field of Classification Search
USPC .................................................. 382/154, 128
See application file for complete search history.

(56) References Cited

U.S. PATENT DOCUMENTS 7,991,221 B1 * 8/2011 Kling ............................ 382/154

* cited by examiner

*Primary Examiner* — Wesley Tucker

(57) ABSTRACT

The invention concerns the calculation of genus of digital or cubic three-dimensional object (3D), said genus is the number of tunnels indicating holes such as in donates. The invention is characterized in that said method comprises a step in selecting (counting) numbers of different types of points on the boundary of the object then obtaining genus.

1 Claim, 5 Drawing Sheets

Track the boundary of M, B.

↓

Separate B into several closed surfaces B(1),...,B(k)

↓

Categorize points on the surface B(i) to M3,M4,M5,M6. (Mi indicates the set that each element has i-neighbors.)

↓

Calculate the genus of each closed surface in the boundary B(i) using $g=1+(M5+2\ M6-M3)/8$

↓

Calculate homology groups H0, H1, H2, and H3

COMPUTING GENUS AND HOMOLOGY GROUPS IN 3D DIGITAL SPACE

CROSS-REFERENCE TO RELATED APPLICATION

None

FIELD OF THE INVENTION

The field of this invention is image processing. More precisely, the invention relates to the processing of images produced from 3D image obtained from a device such as CT and MRI scans. More precisely again, the invention relates to the 3D image structure to find out how many tunnels (wholes) in the image.

The invention can be used to recognize wholes and cracks in a 3D object, If genus is zero that simply indicates there is no wholes. Its applications include medical images and CT applications.

Industrial automation and inspection in many industries (e.g., automotive manufacture, electronics manufacture, food and agriculture production, printing and textiles, just to name a few)
  medical applications (including artificial vision for the blind)
  automobile driver assistance
  digital photography
  film and video analysis (e.g., sports analysis)
  computer games
  image searching
  people tracking
  safety monitoring
  security and biometrics
  3D modeling
  traffic and road management
  Application can also include cultural applications, games and/or cooperative work.

REFERENCES

[1] L. Chen, Y. Rong, Linear time recognition algorithms for topological invariants in 3D, Proceedings of International Conference on Pattern Recognition (ICPR), 2008. pp 1-4.
[2] L. Chen, *Discrete Surfaces and Manifolds*, SP Computing, Rockville, 2004.
[3] C. J. A. Delfinado, H. Edelsbrunner, An Incremental Algorithm For Betti Numbers Of Simplicial Complexes On The 3-Sphere, Computer Aided Geometric Design 12 (1995), 771-784.
[4] T. K. Dey, S. Guha, Computing Homology Groups Of Simplicial Complexes In R3. Journal Of The ACM 45 (1998) 266-287.
[5] A. Hatcher, *Algebraic Topology*, Cambridge University Press, 2002.
[6] T. Kaczynski, K. Mischaikow And M. Mrozek, Computing Homology, Homology, Homotopy
And Applications, Vol. 5(2), 2003, Pp. 233-256
[7] T. Kaczynski, K. Mischaikow, M. Mrozek, *Computational Homology* Springer Series: Applied
Mathematical Sciences, Vol. 157, 2004,
[8] W. D. Kalies, K. Mischaikow And G. Watson, Cubical Approximation And Computation Of Homology,
Banach Center Publ. 47, 115-131 (1999).

BACKGROUND OF THE INVENTION

Computing topological properties for a 3D object in 3D space is an important task in image processing [1][2]. The recent developments in medical imaging and 3D digital camera systems raise the problem of the direct treatment of digital 3D objects. In the past, 3D computer graphics and computational geometry have usually used triangulation to represent a 3D object [3][4][6][7].

Basically, the topological properties of an object in 3D contain connected components, genus of its boundary surfaces, and other homologic and homotopic properties [5]. In 3D, this problem of obtaining fundamental groups is decidable but no practical algorithm has yet been found. Therefore, homology groups have played the most significant role. Research shows that a key factor of computing homology groups of 3D objects is the genus of the boundary surface of the 3D object [3].

Theoretical results show that there exist linear time algorithms for calculating genus and homology groups for 3D Objects in 3D space [3]. However, the implementation of these algorithms is not simple due to the complexity of real data samplings. Most of the algorithms require the triangulation of the input data since it is collected discretely [3-7]. However, for most medical images, the data was sampled consecutively, meaning that every voxel in 3D space will contain data. In such cases, researchers use the marching-cubes algorithm to obtain the triangulation since it is a linear time algorithm. However the spatial requirements for such a treatment will be at least doubled by adding the surface-elements (sometimes called faces).

In this invention, we look at a set of points in 3D digital space, and our purpose is to find homology groups of the data set. The direct algorithm without utilizing triangulation was proposed by Chen and Rong in 2008 [1].

In [1], we discuss the geometric and algebraic properties of manifolds in 3D digital spaces and the optimal algorithms for calculating these properties. We consider digital surfaces as defined in [2].

We presented a theoretical optimal algorithm with time complexity O(n) to compute the genus and homology groups in 3D digital space, where n is the size of the input data [1].

The key in the algorithm in [1] is to find the genus of the closed digital surfaces that is the boundary of the 3D object. This INVENTION will provide a process that deals with simulated and real data in order to obtain the topological invariants such as connected components, boundary surface genus, and homology groups (not generators as described in [4]).

BRIEF SUMMARY OF THE INVENTION

These objectives, and others that will become clear later, are achieved a process for directly calculating the genus without a triangular mesh. The said mesh is defined as an arrangement of vertices and triangular faces, each being defined by three references to the vertices that it connects, and with three edges connecting each of the said vertices.

In this invention, the representation of data sets is only based on the natural cubic three-dimensional (3D) object. The said cubic is eight-integer points (or vertices) at the corners of a cube in 3D.

According to the invention, this process comprises several steps for final genus result. In the past, people only do this based on local search and merge of 2D faces. Thus, the invention is based on a total innovative and inventive approach to an object in three dimensions. Also the representation of an object only uses natural cubic not simplicial complexes (triangulations). The speed will be much improved.

The invention is based particularly on the application of the Gauss-Bonnet theorem in digital space. That Gauss-Bonnet theorem says, in general, the genus is based on total curvature of the boundary surface of a 3D object. Such Gauss-Bonnet method is said to be a global method since it does not working on each individual path through the point as the existing method does.

Advantageously, this type of process according to the invention also comprises a fast process to find all boundary points.

Gauss-Bonnet Theorem and Closed Digital Surfaces: The Gauss-Bonnet theorem states that if M is a closed manifold, then $$\int_M K_G dA = 2\pi \times (M)$$

$$\Sigma_{\{p \text{ is a point in } M\}} K(p) = 2\pi \cdot (2-2g)$$

Applying this theorem to digital space, we obtain in [1] that $g=1+(M5+2M6-M3)/8$.

We now describe a procedure for computing the homology group of 3D objects in 3D digital space. The theoretical foundation that verifies this procedure can be found in [1].

Assuming we only have a set of points in 3D. We can digitize this set into 3D digital spaces.

There are two ways of doing so: (1) by treating each point as a cube-unit that is called the raster space, (2) by treating each point as a grid point, which is also called the point space. These two are dual spaces. Using the algorithm described in [2], we can determine whether the digitized set forms a 3D manifold in 3D space in direct adjacency for connectivity.

Let us assume that we have a connected 3D object M. If it is not, use a labeling or search method, a computer machine can separate M to be several 3D objects.

The Main Procedure:

Step 1. Track the boundary M, said B, which is a union of several closed surfaces. This algorithm only needs to scan though all the points in M to see if the point is linked to a point outside of M. That point will be on boundary.

Step 2. Calculate the genus of each closed surface (e.g. B(1) . . . , B(k)) in the boundary B. The method is the following: since there are six different types of boundary points (on the boundary surface), two of them has 4 neighbors, and two of them has 6 neighbors in the surface (FIG. 1). We can use M3, M4, M5, M6 to denote the numbers of different types. Mi represents the number of points each of which has i-neighbors. The genus $g=1+(M5+2M6-M3)/8$ [1].

Step 3. Using the Theorem 2.2, we can get homology groups H0, H1, H2, and H3. H0 is Z. For H1, we need to get b1(B) that is just the summation of the genus in all connected components in B. H2 is the number of components in B. H3 is trivial.

Therefore, we can use linear time algorithms to calculate g and all homology groups for digital manifolds in 3D [1, 2].

Theorem There is a linear time algorithm to calculate all homology groups for each type of manifold in 3D.

BRIEF DESCRIPTION OF THE DRAWINGS

Other characteristics and advantages of the invention will be understood more clearly upon reading the following description of a preferred embodiment, given solely for illustrative purposes and that is in no way limitative, accompanied by the appended figures wherein.

DETAILED DESCRIPTION OF PREFERRED EMBODIMENTS

The following detailed description of the preferred embodiments is made to the accompanying drawings that form a part hereof, and in which is shown by way of illustration specific embodiments in which the invention may be practiced. It is to be understood that other embodiments may be utilized and structural changes may be made without departing from the scope of the present invention.

GLOSSARY

The following definitions are used throughout this specification to describe the preferred embodiment:

3D Digital Image

A 3D array stored in computer memory in which each element is numerical value usually an integer.

3D Object

A part of the 3D image usually form a thing that is not separated. In other words, it is connected.

Foreground and Background in the 3D Image.

In a 3D image, the foreground is the all elements that are above value 0, the Background are all elements that are 0.

Boundary of a 3D Object

The collection of those elements in the object each of which has a neighbor in background.

Digital Surface Point in 3D

Figure 1:
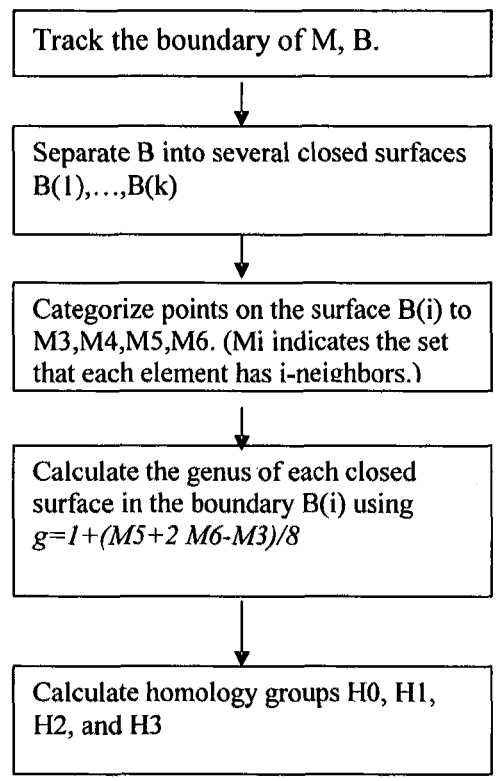
FIG. 1 shows a block diagram of the different steps applied during the process for genus calculation according to the invention.
Figure 2:
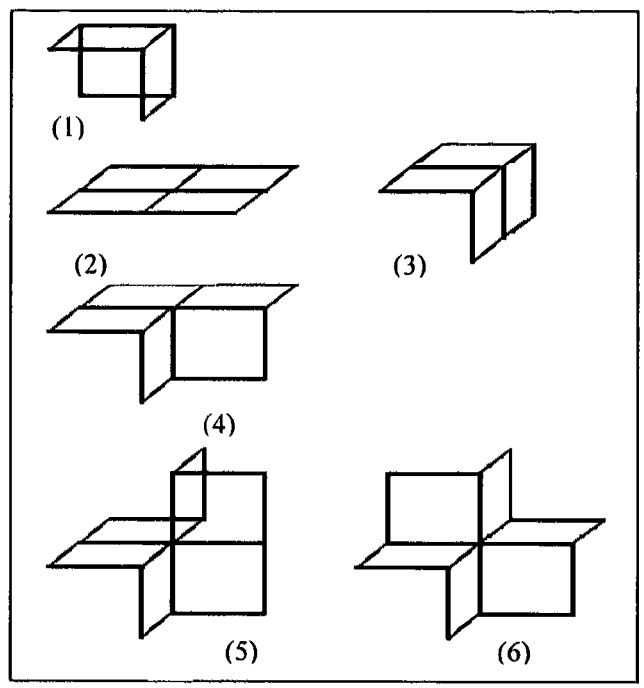
FIG. 2 The six types of boundary configuration of the local points according to the process in FIG. 1.

One of the six configurations is called a digital surface point in 3D. The six configurations are shown in FIG. 2.

(Closed) Digital Surface

A set of elements in a 3D image (their values are above zero), each element is digital surface point.

A Connected Component

Some foreground elements (points) are linked together. Meaning that there is path to link them.

Pathological Configuration

Some boundary points might not be categorized into the six types as in FIG. 2. Those are some noises or some none surface factor. We need to display the local configuration, and modify it using human interaction to fix it. Will be only a few of them.

In this patent, we are not dealing with an automated procedure for deleting the Pathological configuration.

Embodiments

Figure 5:
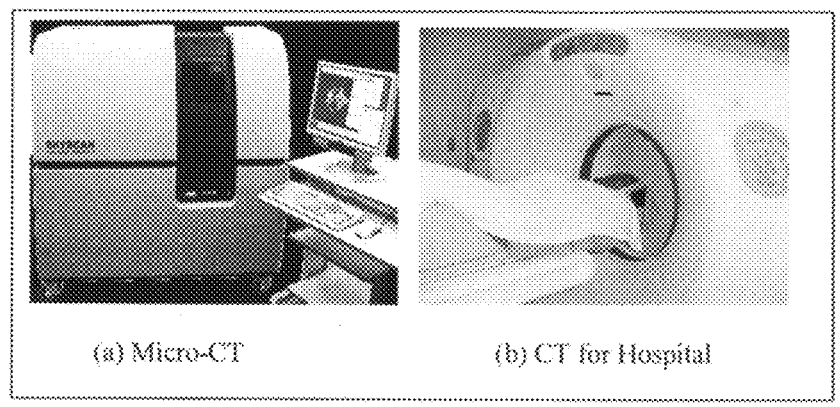
FIG. 5. Machines that obtain the data presented in FIG. 4.
Figure 6:
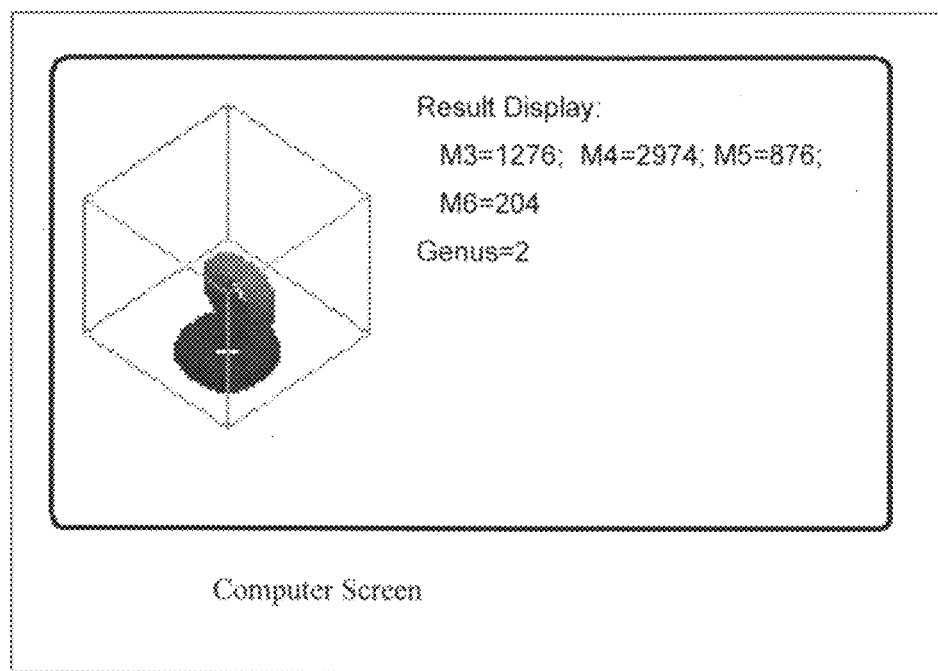
FIG. 6 Result displayed illustrated in FIG. 1.

Get data from the device shown in FIG. 5. Store the data in memory as M. Set up a clip level (for instance 10). Every element whose value is below 10 means the background pixels. All other pixels are also called M.

Figure 4:
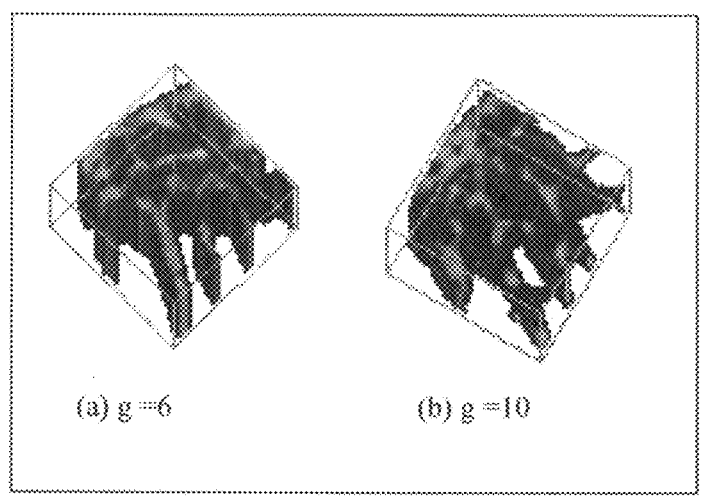
FIGS. 4a, and 4b Examples of Real 3D Objects.

Get all connected components of M. Each of the component will still called M. So M is a single 3D object. For instance, M can be the image shown in FIG. 4a or 4b.

Figure 3:
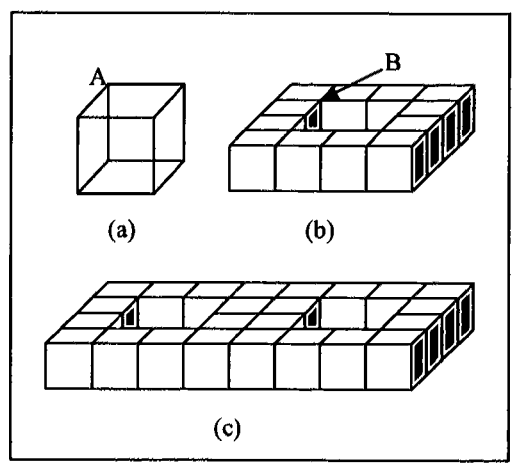
FIGS. 3a, 3b and 3c 3a A 3D cube according to the process in FIG. 1.

Find the boundary of M, called B. B may contain several closed surfaces B(1), . . . , B(k) as shown in FIG. 3b or 3c. Each the digital point on the surface is one of the six configurations shown in FIG. 2.

Use the formula $g=1+(M5+2M6-M3)/8$ to find genus of B(i). Such as the genus for FIG. 3c is 2.

Calculate homology group H0 is Z, the integer; homology group H1, is equivalent to b1 of boundary that is just the summation of the genus in all connected components in boundary; homology group H2 is the number of components in the boundary; homology group H3 is equivalent to 0.

CONCLUSION AND FAQ

1. What are the objectives of the invention?
    A fast method to get structural information for complex 3D images
2. What problem or problems does the invention solve
    The Practical and fast method for 3D image classification.
3. How does the invention solve the problem or problems
    Write software based on the method and associated algorithms. Use computers or embedded chip processors to process a 3D image that can be captured by 3D camera or medical instruments such as CT or MR, and other methods.
4. How does the invention differ from already patented or made inventions
    Before the invention of this method, the only method that calculate genus for 3D objects is using triangulation method. That transfers the 3D digital image into 3D geometric object described by tetrahedral (3D polyhedrons). Our method directly use the image collected. The algorithm based on the new digital method and a new formula.
5. What improvements or new features are part of the invention
    The method uses the raw image directly and the algorithm reaches the minimum in terms of time and space costs in computers. The speed is at least 10 time fast than existing methods.
6. How does the invention work or what process steps are involved
    Input a 3D image into a computer or directly save 3D images into computer memory, our method will calculate the invariants of the image and to make classification.

What is claimed is:

1. A computer-implemented method for use in calculating genus for the physical three-dimensional object using for a 3D imaging system, (A arbitrarily shaped physical object having a volume), the 3D imaging system having the image capturing device(s), a keyboard, screen display, processor, and memory, the method comprising the steps of:
    (a) using the 3D imaging system, capturing a 3D image, the 3D image having an electronic form that can be electronically manipulated in the memory and from which the 3D imaging system can create and display a visual representation of the object; and
    (b) defining the object from choosing a range of display, and storing the object definition in an electronic form in a digital storage medium; and
    (c) using a computer, obtaining the electronic form of the object definition from the digital storage medium and automatically producing an electronic form of a boundary points for the object; and
    (d) using a computer, obtaining the electronic form of the a boundary points of the object, calculating different types of the points, storing the counting number for each type to digital storage medium; and
    (e) using a computer, obtaining the electronic form of the counting number for each type from digital storage medium, and automatically producing the genus and save and display; and
    (f) using a computer, obtaining the electronic form of genus and automatically producing homology groups and display; and
    (g) wherein the step of automatically producing an electronic form of a boundary points for the object further, this step comprises the sub-steps of:
    (g.1) reading object data;
    (g.2) numerically scanning the point definition to detect if it is on the boundary, if it is on the boundary, mark the point; and
    (h) wherein the step of calculating different types of the points, storing the counting number for each type to digital storage medium, this step comprises the sub-steps of:
    (h.1) numerically scanning the marked point definition check that the number of marked points in its neighbors; put it into a category that indicates the type of boundary surface points;
    (h.2) get the number of points in each type and store the numbers of each type to memory;
    (h.3) this becomes the counting numbers M3 M4, MS, M6 indicating the boundary points having three, four, five, and six marked neighboring points; and
    i) wherein the step of automatically producing the genus and save and display, this step comprises the sub-steps of:
    (i.1) using the counting numbers calculated in step (h.3), the genus $g=1+(M5+2\ M6-M3)/8$;
    (i.2) save the number calculated from CLI) to memory; and
    (j) wherein the step of automatically producing homology groups and display, this step comprises the sub-steps of:
    (j.1) homology group HO is Z the integer; (j.2) homology group H1, is equivalent to b1 of boundary that is just the summation of the genus in all connected components in boundary;
    (j.3) homology group H2 is the number of components in the boundary;
    (j.4) homology group H3 is equivalent to O.

* * * * *